Figure 1:
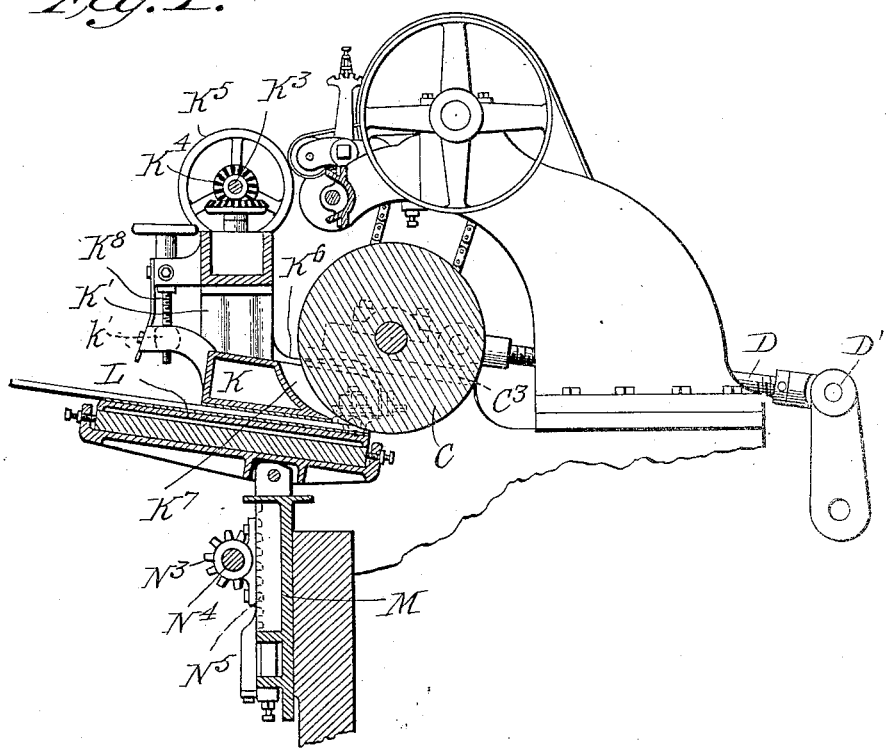

No. 778,486. PATENTED DEC. 27, 1904.
C. L. GOEHRING & W. TROCHE.
GLASS GRINDING MACHINE.
APPLICATION FILED APR. 13, 1904.

3 SHEETS—SHEET 1.

Witnesses
Edwin L. Jewell
Alexander Stewart

Inventors
Chas. L. Goehring
William Troche
By Church & Church
Their Attorneys

No. 778,486. PATENTED DEC. 27, 1904.
C. L. GOEHRING & W. TROCHE.
GLASS GRINDING MACHINE.
APPLICATION FILED APR. 13, 1904.
3 SHEETS—SHEET 2.
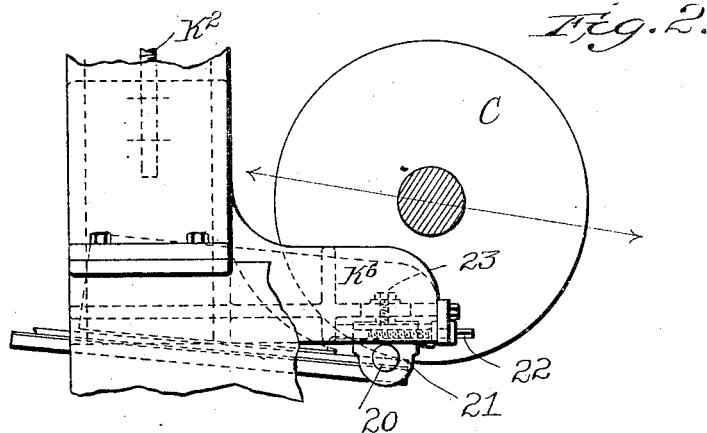
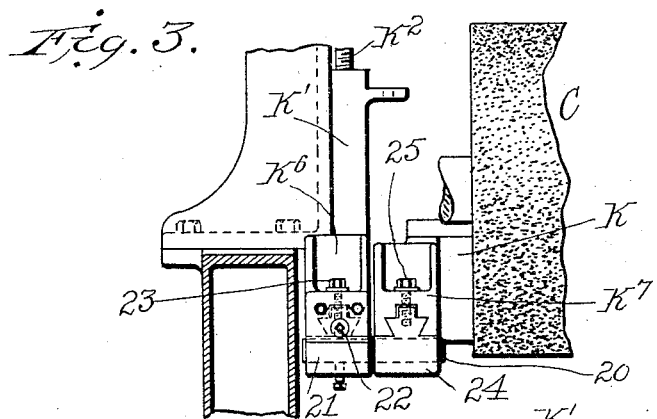
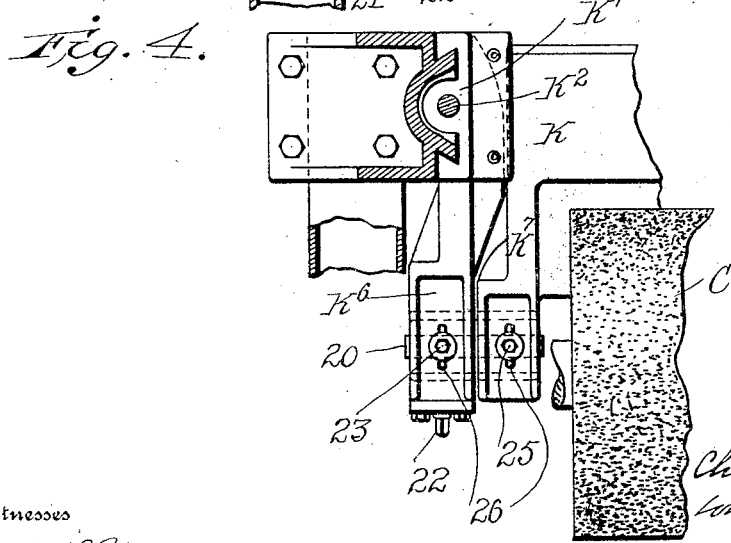

No. 778,486. PATENTED DEC. 27, 1904.
C. L. GOEHRING & W. TROCHE.
GLASS GRINDING MACHINE.
APPLICATION FILED APR. 13, 1904.
3 SHEETS—SHEET 3.
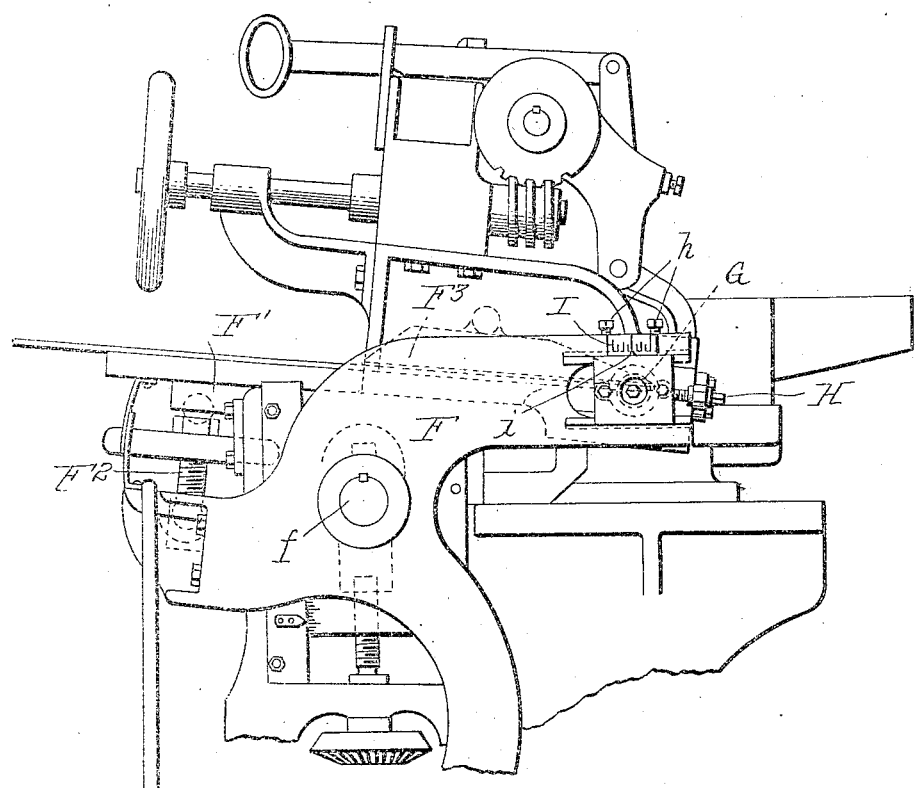
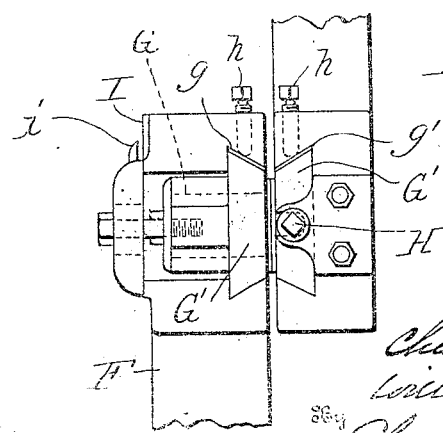

No. 778,486. Patented December 27, 1904.

UNITED STATES PATENT OFFICE.

CHARLES L. GOEHRING AND WILLIAM TROCHE, OF AKRON, OHIO; SAID TROCHE ASSIGNOR TO SAID GOEHRING.

GLASS-GRINDING MACHINE.

SPECIFICATION forming part of Letters Patent No. 778,486, dated December 27, 1904.

Application filed April 13, 1904. Serial No. 202,954.

*To all whom it may concern:*

Be it known that we, CHARLES L. GOEHRING and WILLIAM TROCHE, both of Akron, in the county of Summit and State of Ohio, have invented certain new and useful Improvements in Glass-Grinding Machines; and we do hereby declare the following to be a full, clear, and exact description of the same, reference being had to the accompanying drawings, forming a part of this specification, and to the figures and letters of reference marked thereon.

This invention relates to glass-grinding machinery, and particularly to machinery for beveling glass plates by a grinding process, the objects of the invention being to provide an improved mechanism for holding the glass during its presentation to the grinder with means whereby the adjustments necessary for making bevels of different depth and width are facilitated.

A further object of the invention is to simplify the mechanical structure whereby the parts may be made of sufficient strength to withstand the pressure of a forced grinding operation without disturbing the adjustments necessary for accurate work.

The invention consists in a glass-holding mechanism pivoted on an axis substantially coincident with the inner edge of the bevel, with means whereby said axis may be adjusted in the direction of the width of the bevel combined with means whereby the angular position of the glass about said axis may be adjusted to vary the depth of the bevel.

The invention further consists in a glass clamping and holding mechanism mounted on a pivotal axis substantially coincident with the inner edge of the bevel, with means whereby the angular position of the glass may be adjusted to vary the depth of bevel without variation of the width.

The invention further consists in certain novel details of construction and combinations and arrangements of parts, all as will be now described, and pointed out particularly in the appended claims.

Referring to the accompanying drawings, Figure 1 is a vertical section through a machine for beveling glass embodying the present improvements, certain portions of the operating mechanism being shown in elevation and other portions not directly related to the present improvements being omitted. Fig. 2 is a detail side elevation with parts in section and partly broken away, showing the grinder and adjusting mechanism for the pivot or axis of the glass-holding devices. Fig. 3 is a sectional elevation looking toward the left of the parts shown in Fig. 2. Fig. 4 is a sectional top plan view of the same. Fig. 5 is a view corresponding to Fig. 2, but showing a clamping and holding mechanism adapted for the presentation of the glass to the upper surface of the grinder. Fig. 6 is an elevation of the parts illustrated in Fig. 5 looking toward the left.

Like letters and figures of reference in the several figures indicate the same parts.

Referring to Figs. 1 to 4, the letter C indicates a rotary grinder adapted to be rotated by any form of driving mechanism and preferably mounted on ways $C^3$, so as to be capable of a bodily traverse in the plane of the bevel to be formed. The traverse movements of the grinder are imparted thereto by a crank D', connected with the grinder-bearings through the medium of connecting-rods D, appropriate mechanism forming no part of the present invention being employed for oscillating the crank D' to the desired extent. A frame K', vertically adjustable in the machine-frame by means of screws $K^2$, shaft $K^3$, bevel-gears $K^4$, and hand-wheel $K^5$, is provided with forwardly-extending arms $K^6$, in the ends of which the journals for the glass-holding mechanism are mounted. This glass-holding mechanism consists, primarily, of a bed K, having arms $K^7$ journaled in the arms $K^6$ and adapted to be angularly adjusted about its pivotal point by proper mechanism, and a coöperating clamp L, pivotally mounted on its support, so as to be capable of conforming to the angular position of the bed or surface of the glass being clamped against the bed. The mechanism for adjusting the angular position of the bed (illustrated in Fig. 1) consists of a screw $K^8$, journaled in the frame K' and coöperating with a screwnut K', carried by the bed K. The adjusting mechanism for the clamp consists of a pinion N³, mounted on a shaft N⁴, adapted to be rotated by proper mechanism, (not shown,) said pinion N³ coöperating with a rack N⁵ on the clamp-support M, as will be readily understood. The axis about which the bed K is angularly adjustable is made to coincide or substantially coincide with the inner edge of the bevel formed on the glass, as will be more readily understood by an inspection of Fig. 2, and when so positioned with relation to the bevel it will be observed that by adjusting the angular position of the bed the depth of the bevel may be varied without in any wise varying the width, and consequently a workman handling the ordinary run of glass, which comes in sheets of varying thickness, may quickly and accurately adjust the machine for beveling any of the plates, so that all will present a uniform appearance, and such adjustment requires only the manipulation of a single hand-wheel. In order to provide for forming bevels of differing width, the axis about which the bed K pivots is made adjustable in the direction of the width of the bevel, and in the preferred construction this adjustment is made to take place in a plane substantially coincident with the face side of the glass. The adjustment may be effected by mounting the bearing for the pivot of the bed so as to be adjustable either in the arms K⁶ of the supporting-frame or in the arms K⁷ of the bed; but in the preferred construction both adjustments are provided, inasmuch as by this construction the pivot itself may be adjusted without varying at all the bodily position of the bed itself. Referring to Figs. 2, 3, and 4, it will be seen that the pivot 20 is mounted in boxes or bearings 21 and 24, both of the latter being adjustable transversely of the axis, one, that numbered 21, being mounted in guides or ways in the arms K⁶, and the other, 24, being mounted in guides or ways in the arms K⁷. The adjustment may be effected by a screw 22, and the bearings when adjusted may be conveniently clamped in position by the clamping-screws 23 and 25 passing through slots 26 in the arms and threaded into the boxes or bearings, as shown. The ways in the arms K⁷ extend in a plane substantially coincident with the face of the glass clamped against the under surface of the bed K, and consequently the angular position of the bed with respect to the pivot is not varied by the adjustment of the pivot in the manner described.

Obviously the invention may be carried into effect by a variety of different mechanisms and applied to machines of widely-different character, and in Figs. 5 and 6 one such variation is illustrated. In these figures the glass is so held as to be capable of presentation to a grinder which moves or is located below the level of the glass, the particular arrangement, however, of the grinder with relation to the glass holding and clamping mechanism forming no part of the present invention. In these particular Figs. 5 and 6 the entire glass holding and clamping mechanisms is mounted on a frame F, which is pivotally supported on an axis f in order that the edge of the glass may be brought down upon or raised from the grinder. The bed F' in this instance is pivotally mounted in the frame, and its angular position with relation to its pivots is determined by an adjusting-screw F², while the clamp F³, which latter is located above the glass, is adapted to be brought down on the upper surface of the glass by any proper mechanism not necessary to describe herein. The pivot G, about which the angular position of the bed is adjusted, is mounted, as in the former instance, in boxes or bearings G', movable in ways g g' in the frame F and bed, respectively, the adjustments of said bearings or boxes being effected by an adjusting-screw H and the clamping of said boxes in adjusted position being effected by set-screws h. Obviously gages may be provided for indicating the adjustments, and in Fig. 5 a graduated scale I is provided on one of the arms of the frame F, and a pointer i on one of the boxes is adapted to register therewith. This gage will indicate the width of the bevel, and when in the position illustrated it is supposed to indicate a bevel one inch wide. The depth of the bevel may be readily determined by adjusting the angular position of the bed about the pivot G by means of the screw F². In operation the workman placing the glass in position will observe whether it is a thin or a thick plate and adjust the screw F² to correspond, so that all of the plates when finished will present the same appearance. This adjustment is highly important, inasmuch as the bevels of commercial glass of a given size are practically all of the same width; but the bevels must vary in depth in accordance with the thickness of the plate, and with the present machine the adjustments are so simple that they may be effected and the machine operated by an ordinary unskilled workman. At the same time the arrangement is such that rigid supports of ample strength are afforded which will permit the grinding operation to be forced without danger of distortion such as would break the glass or give irregular results.

Having thus described our invention, what we claim as new, and desire to secure by Letters Patent, is—

1. In a glass-beveling machine, the combination with the grinder, of a glass-holder pivotally mounted on an axis substantially coincident with the inner edge of the bevel; substantially as described.

2. In a glass-beveling machine, the combination with the grinder, of a glass-holder angularly adjustable about an axis substantially coincident with the inner edge of the bevel; substantially as described.

3. In a glass-beveling machine, the combination with the grinder, of a glass-holder angularly adjustable about an axis adjustable in a plane in the direction of the width of the bevel; substantially as described.

4. In a glass-beveling machine, the combination with the grinder, of a glass-holder angularly adjustable about an axis adjustable in a plane coincident with the surface of the glass and in the direction of the width of the bevel; substantially as described.

5. In a glass-beveling machine, the combination with the grinder, of a bed against which the glass is clamped angularly adjustable about an axis substantially coincident with the inner edge of the bevel and means for effecting a bodily adjustment of the bed; substantially as described.

6. In a glass-beveling machine, the combination with the grinder, of a bed against which the glass is clamped, a movable frame in which said bed is pivoted on an adjustable axis, means for adjusting the frame and means for adjusting the axis on which the bed pivots in the direction of the width of the bevel; substantially as described.

7. In a glass-beveling machine, the combination with the grinder, of a bed against which the glass is clamped, a frame in which the bed is pivotally mounted and means for adjusting the pivot with relation to both the bed and frame; substantially as described.

8. In a glass-beveling machine, the combination with the grinder, of a bed against which the glass is clamped, an adjustable frame in which the bed is pivotally mounted and means for adjusting the pivot with relation to both the bed and frame; substantially as described.

9. In a glass-beveling machine, a glass-holder pivotally mounted on an axis located in the plane of the glass and at a point inside of the edge of the glass being operated on; substantially as described.

CHARLES L. GOEHRING.
WILLIAM TROCHE.

Witnesses:
FRED J. STEINERT,
IDA M. JONES.